United States Patent
Sankaran

(10) Patent No.: US 11,528,720 B2
(45) Date of Patent: Dec. 13, 2022

(54) METHOD AND APPARATUS FOR FACILITATING RESOURCE PAIRING USING A DEEP Q-NETWORK

(71) Applicant: Nokia Solutions and Networks Oy, Espoo (FI)

(72) Inventor: Chandrasekar Sankaran, Murray Hill, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 92 days.

(21) Appl. No.: 17/040,722

(22) PCT Filed: Mar. 27, 2018

(86) PCT No.: PCT/US2018/024538
§ 371 (c)(1),
(2) Date: Sep. 23, 2020

(87) PCT Pub. No.: WO2019/190476
PCT Pub. Date: Oct. 3, 2019

(65) Prior Publication Data
US 2021/0014872 A1     Jan. 14, 2021

(51) Int. Cl.
*H04W 72/02*     (2009.01)
*H04W 72/12*     (2009.01)
(Continued)

(52) U.S. Cl.
CPC ............. *H04W 72/12* (2013.01); *G06N 3/04* (2013.01); *G06N 3/08* (2013.01); *G06N 20/00* (2019.01); *H04W 72/046* (2013.01)

(58) Field of Classification Search
CPC .......... H04B 7/022; H04L 41/16; G06N 3/04; G06N 3/0454; G06N 3/08; G06N 7/005;
(Continued)

(56) References Cited

U.S. PATENT DOCUMENTS 10,666,342 B1 *   5/2020   Landis ................ G06N 3/0454
2018/0279286 A1 *  9/2018   Akoum ............... H04W 72/046
(Continued)

FOREIGN PATENT DOCUMENTS

CN     106910351 A     6/2017
KR     101252394 B1    4/2013
(Continued)

OTHER PUBLICATIONS

Liu et al., Deep Reinforcement Learning Based Dynamic Channel Allocation Algorithm in Multibeam Satellite Systems, IEEE, 10 pages, Apr. 18, 2018.*
(Continued)

*Primary Examiner* — Frank Duong
(74) *Attorney, Agent, or Firm* — Harness, Dickey & Pierce, P.L.C.

(57) ABSTRACT

A method of determining a sequence of actions includes training a first deep Q-network (DQN); providing a plurality of entries of a first multi-dimensional matrix as input to the DQN, the first matrix representing a first state, each entry of
(Continued)

the first matrix representing an action that can be taken in the first state; determining, using the first DQN, a plurality of Q-values for the plurality of entries of the first matrix, respectively; executing a first action, the first action being the action represented by the entry, from among the plurality of entries, for which the first DQN determined the highest Q-value among the plurality of determined Q-values; accumulating a reward based on executing the first action; and transitioning from the first state to a next state in accordance with a first set of rules and the executed first action.

29 Claims, 7 Drawing Sheets

(51) Int. Cl.
    *G06N 20/00*     (2019.01)
    *G06N 3/04*     (2006.01)
    *G06N 3/08*     (2006.01)
    *H04W 72/04*     (2009.01)

(58) Field of Classification Search
    CPC ...... G06N 20/00; H04W 16/28; H04W 72/04; H04W 72/0406; H04W 72/046; H04W 72/12
    See application file for complete search history.

(56) References Cited

U.S. PATENT DOCUMENTS

| | | | |
|---|---|---|---|
| 2019/0014488 A1* | 1/2019 | Tan | H04W 24/02 |
| 2019/0116605 A1* | 4/2019 | Luo | H04B 7/024 |
| 2019/0253900 A1* | 8/2019 | Narasimha | H04W 16/28 |

FOREIGN PATENT DOCUMENTS

| | | |
|---|---|---|
| WO | WO-2016/094862 A2 | 6/2016 |
| WO | WO-2017/189859 A1 | 11/2017 |
| WO | WO-2018/031908 A1 | 2/2018 |

OTHER PUBLICATIONS

Mnih et al., Human-level control through deep reinforcement learning, Nature, 13 pages, Feb. 26, 2015.*
Watkins et al., Q-Learning, Kluwer Academic Publishers, 14 pages, 1992.*
International Search Report PCT/ISA/210 for International Application No. PCT/US2018/24538 dated Jul. 28, 2018.
Extended European Search Report dated Oct. 15, 2021 issued in corresponding European Appln. No. 18912370.6.
A. Klautau et al. '5G MIMO Data for Machine Learning: Application to Beam-Selection using Deep Learning' IEEE, 2018, pp. 1-9.
S. Liu et al. 'Deep Reinforcement Learning Based Dynamic Channel Allocation Algorithm in Multibeam Satellite Systems' *IEEE*, 2018, vol. 6, pp. 15733-15742.

* cited by examiner

METHOD AND APPARATUS FOR FACILITATING RESOURCE PAIRING USING A DEEP Q-NETWORK

CROSS-REFERENCE TO RELATED APPLICATIONS

This application is a national phase under 35 U.S.C. § 371 of PCT International Application No. PCT/US2018/24538 which has an International filing date of Mar. 27, 2018, the entire contents of each of which are hereby incorporated by reference.

BACKGROUND

1. Field

Example embodiments relate generally to methods and apparatuses for determining a sequence of actions, and particularly to using deep Q-network technology to facilitate resource pairing in communications network resource allocation.

2. Related Art

In 5G multi-user MIMO (MU-MIMO), each cell has multiple sub-cells, each with its own antenna array. The scheduler in the cell needs to assign beams to active UEs on a per transmission time interval (TTI) basis. One objective of the scheduler is to assign UEs to beams in such a manner that a desirable or, alternatively, maximum total system throughput is achieved.

SUMMARY

According to at least some example embodiments, a method of determining a sequence of actions includes training a first deep Q-network (DQN); providing a plurality of entries of a first multi-dimensional matrix as input to the DQN, the first matrix representing a first state, each entry of the first matrix representing an action that can be taken in the first state; determining, using the first DQN, a plurality of Q-values for the plurality of entries of the first matrix, respectively; executing a first action, the first action being the action represented by the entry, from among the plurality of entries, for which the first DQN determined the highest Q-value among the plurality of determined Q-values; accumulating a reward based on executing the first action; and transitioning from the first state to a next state in accordance with a first set of rules and the executed first action.

The training of the first DQN may include initializing first weights; randomly selecting a mini-batch of sample states from among a plurality of stored states, each stored state including a plurality of entries corresponding to a plurality of actions; and for each sample state $S_j$ among the randomly selected mini-batch of sample states determining one or more valid actions of the sample state $S_j$ based on the first set of rules, generating, using the first DQN having the first weights, one or more first Q-values corresponding, respectively, to the one or more valid actions of the sample state $S_j$, generating, using a second DQN having second weights, one or more target values corresponding, respectively, to the one or more valid actions of the sample state $S_j$, and updating the first weights based on the one or more first Q-values and the one or more target values.

Each valid action of the sample state $S_j$ may be an action that is permitted to be executed in the sample state $S_j$, in accordance with the first set of rules.

Initializing the first weights may include randomly selecting the first weights.

The method of determining a sequence of actions may further include initializing the second weights by setting the second weights equal to the first weights.

The generating one or more target values may include determining, for each valid action a among A, $$y_j(a) = \left[R(a) + \gamma * \max_{a'} Q(S_{j,next}(a), a'; \theta^-)\right],$$

where A represents the one or more valid actions of the sample state $S_j$, $y_j(a)$ represents the target value, from among the one or more target values, that corresponds to the valid action a, R(a) represents a reward value corresponding to the valid action a, y represents a discount parameter having a value not less than 0 and not more than 1, $S_{j,next}(a)$ represents a next state which would result, in accordance with the first set of rules, from executing valid action a with respect to the sample state $S_j$, $\theta^-$ represents the second weights of the second DQN, the expression $$\max_{a'} Q(S_{j,next}(a), a'; \theta^-)$$

represents a maximum Q-value from among one or more next Q-values generated by the second DQN, and the generating of the one or more next Q-values includes the second DQN generating, for each valid action a' among one or more valid actions of the next state $S_{j,next}(a)$, one of the one or more next Q-values. Further, the updating the first weights may performing a batch gradient descent step in the first DQN using the randomly selected mini-batch of samples such that, for each sample $S_j$ of the randomly selected mini-batch of samples, a loss value to minimize= $[y_j(A)-Q(S_j, A; \theta)]^2$, where $y_j(A)$ represents a concatenation of the one or more target values $y_j(a)$ generated for each valid action a among the one or more valid actions A, the expression $Q(S_j, A; \theta)$ represents the first Q-values, and $\theta$ represents the first weights.

The method of determining a sequence of actions may further include iteratively performing each of the providing, determining, executing, accumulating and transitioning steps for each consecutive state until reaching a terminal state, the terminal state being a state for which no valid action exist.

A valid action of a current state may be an action that is permitted to be executed in the current state, in accordance with the first set of rules.

Executing the first action may include assigning resources in a wireless communications network.

For each entry among the plurality of entries of the first matrix, a numerical value of the entry may correspond to a reward associated with executing the action represented by the entry.

According to at least some example embodiments, a method of operating a scheduler in a wireless communications network includes obtaining, at the scheduler, a plurality of metric values, each metric value corresponding to a UE-beam pair, from among a plurality of UE-beam pairs, each UE-beam pair including a UE from among a plurality of UEs and a beam from among a plurality of beams; performing a UE-beam pair selecting operation including, determining, by a deep Q-network (DQN) of the scheduler, based on the plurality of metric values, a plurality of Q-values, the plurality of Q-values corresponding, respectively, to the plurality of UE-beam pairs, and selecting a UE-beam pair from among the plurality of UE-beam pairs based on the plurality of Q-values; and assigning the UE included in the selected UE-beam pair to the beam included in the selected UE-beam pair.

The selecting may include selecting a highest Q-value, from among the plurality of Q-values, as the selected Q-value.

The plurality of metric values may be a plurality of proportional fair (PF) metric values, respectively.

For each PF metric value, from among the plurality of PF metric values, the PF metric value may be a ratio of an instantaneous spectral efficiency of a first UE with respect to a first beam to a throughput of the first UE, the first UE being the UE included in the UE-beam pair to which the PF metric value corresponds, the first beam being the beam included in the UE-beam pair to which the PR metric value corresponds.

The assigning may include the scheduler assigning the UE included in the selected UE-beam pair to the beam included in the selected UE-beam pair for a current transmission time interval (TTI).

The selected UE-beam pair may be one of a plurality of selected UE-beam pairs. The method of a operating scheduler in a wireless communications network may further include generating, by the scheduler, the plurality of the plurality of selected UE-beam pairs by performing the UE-beam pair selecting operation a plurality of times. The assigning may include assigning the UEs included in the plurality of selected UE-beam pairs to the beams included in the plurality of selected UE-beam pairs, respectively, for the current TTI.

According to at least some example embodiments, a method of training a scheduler to perform scheduling in a wireless communications network with respect to a plurality of user equipment (UEs) and a plurality of beams includes randomly selecting a mini-batch of sample UE-beam states from among a plurality of stored UE-beam states, where each stored UE-beam state includes a plurality of UE-beam pairs, and a plurality of metric values corresponding to the plurality of UE-beam pairs, respectively. According to at least some example embodiments, each UE-beam pair includes a UE from among the plurality of UEs and a beam from among the plurality of beams. According to at least some example embodiments, the method of training a scheduler to perform scheduling further includes, for each sample UE-beam state $S_j$ among the randomly selected mini-batch of sample UE-beam states, determining one or more valid actions of the sample UE-beam state $S_j$ corresponding, respectively, to one or more valid UE-beam pairs of the UE-beam state $S_j$, based on first scheduling rules, generating, using a first deep Q-network (DQN) having first weights, one or more first Q-values corresponding, respectively, to the one or more valid actions of the sample UE-beam state $S_j$, generating, using a second DQN having second weights, one or more target values corresponding, respectively, to the one or more valid actions of the sample UE-beam state $S_j$, and updating the first weights based on the one or more first Q-values and the one or more target values.

The method of a method of training a scheduler to perform scheduling may further include initializing the first weights by randomly selecting the first weights; and initializing the second weights by setting the second weights equal to the first weights.

For each valid UE-beam pair among the one or more valid UE-beam pairs of the sample UE-beam state $S_j$, the scheduler may be permitted, in accordance with the first scheduling rules, to assign the UE included in the valid UE-beam pair to the beam included in the valid UE-beam pair for a current transmission time interval (TTI), and for each action among the one or more valid actions of the sample UE-beam state $S_j$, the action may include the scheduler assigning the UE included in the valid UE-beam to which the action corresponds to the beam included in the valid UE-beam pair to which the action corresponds.

The generating one or more target values may include determining, for each valid action a among A, $$y_j(a) = \left[ R(a) + \gamma * \max_{a'} Q(S_{j,next}, (a), a'; \theta^-) \right],$$

where A represents the one or more valid actions of the sample UE-beam state $S_j$, $y_j(a)$ represents the target value, from among the one or more target values, that corresponds to the valid action a, R(a) represents the metric value corresponding to the valid UE-beam pair to which the valid action a corresponds, y represents a discount parameter having a value not less than 0 and not more than 1, $S_{j,next}(a)$ represents a next UE-beam state which would result, in accordance with the first scheduling rules, from the scheduler performing valid action a with respect to the sample UE-beam state $S_j$, $\theta^-$ represents the second weights of the second DQN, and the expression $$\max_{a'} Q(S_{j,next}(a), a'; \theta^-)$$

represents a maximum Q-value from among one or more next Q-values generated by the second DQN. The generating of the one or more next Q-values may include the second DQN generating, for each valid action a' among one or more valid actions of the next UE-beam state $S_{j,next}(a)$, one of the one or more next Q-values. The updating the first weights may include performing a batch gradient descent step in the first DQN using the randomly selected mini-batch of UE-beam states such that, for each UE-beam state $S_j$ of the randomly selected mini-batch of UE-beam states, a loss value to minimize=$[y_j(A)-Q(S_j, A; \theta)]^2$, where $y_j(A)$ represents a concatenation of the one or more target values $y_j(a)$ generated for each valid action a among the one or more valid actions A, the expression $Q(S_j, A; \theta)$ represents the first Q-values, and $\theta$ represents the first weights.

According to at least some example embodiments, a scheduler includes memory storing computer-executable instructions; and a processor configured to execute the computer-executable instructions such that the processor is configured to, obtain a plurality of metric values, each metric value corresponding to a UE-beam pair, from among a plurality of UE-beam pairs, each UE-beam pair including a UE from among a plurality of UEs and a beam from among a plurality of beams. According to at least some example embodiments, the processor is further configured to execute the computer-executable instructions such that the processor is configured to perform a UE-beam pair selecting operation including determining, using a deep Q-network (DQN), based on the plurality of metric values, a plurality of Q-values, and selecting a UE-beam pair from among the plurality of UE-beam pairs based on the plurality of Q-values. According to at least some example embodiments, the plurality of Q-values correspond, respectively, to the plurality of UE-beam pairs. According to at least some example embodiments, the processor is further configured to execute the computer-executable instructions such that the processor is configured to assign the UE included in the selected UE-beam pair to the beam included in the selected UE-beam pair.

The processor may be configured to execute the computer-executable instructions such that the selecting includes selecting a highest Q-value, from among the plurality of Q-values, as the selected Q-value.

The processor may be configured to execute the computer-executable instructions such that the plurality of metric values are a plurality of proportional fair (PF) metric values, respectively.

The processor may be configured to execute the computer-executable instructions such that for each PF metric value, from among the plurality of PF metric values, the PF metric value is a ratio of an instantaneous spectral efficiency of a first UE with respect to a first beam to a throughput of the first UE, the first UE being the UE included in the UE-beam pair to which the PF metric value corresponds, the first beam being the beam included in the UE-beam pair to which the PF metric value corresponds.

The processor may be configured to execute the computer-executable instructions such that the assigning includes assigning the UE included in the selected UE-beam pair to the beam included in the selected UE-beam pair for a current transmission time interval (TTI).

The processor may be configured to execute the computer-executable instructions such that the selected UE-beam pair is one of a plurality of selected UE-beam pairs. The processor may be configured to execute the computer-executable instructions such that the processor is further configured to generate, by the scheduler, the plurality of selected UE-beam pairs by performing the UE-beam pair selecting operation a plurality of times. Further, the processor may be configured to execute the computer-executable instructions such that the assigning includes assigning the UEs included in the plurality of selected UE-beam pairs to the beams included in the plurality of selected UE-beam pairs, respectively, for the current TTI.

According to at least some example embodiments, a scheduler includes memory storing computer-executable instructions; and a processor configured to execute the computer-executable instructions such that the processor is configured to randomly select a mini-batch of sample UE-beam states from among a plurality of stored UE-beam states. According to at least some example embodiments, each stored UE-beam state includes a plurality of UE-beam pairs, and a plurality of metric values corresponding to the plurality of UE-beam pairs, respectively, and each UE-beam pair includes a UE from among the plurality of UEs and a beam from among the plurality of beams. According to at least some example embodiments, the processor is further configured to execute the computer-executable instructions such that the processor is configured to, for each sample UE-beam state $S_j$ among the randomly selected mini-batch of sample UE-beam states, determine one or more valid actions of the sample UE-beam state $S_j$ corresponding, respectively, to one or more valid UE-beam pairs of the UE-beam state $S_j$, based on first scheduling rules, generate, using a first deep Q-network (DQN) having first weights, one or more first Q-values corresponding, respectively, to the one or more valid actions of the sample UE-beam state $S_j$, generate, using a second DQN having second weights, one or more target values corresponding, respectively, to the one or more valid actions of the sample UE-beam state $S_j$, and update the first weights based on the one or more first Q-values and the one or more target values.

The processor may configured to execute the computer-executable instructions such that the processor is further configured to initialize the first weights by randomly selecting the first weights; and initialize the second weights by setting the second weights equal to the first weights.

The processor is configured to execute the computer-executable instructions such that, for each valid UE-beam pair among the one or more valid UE-beam pairs of the sample UE-beam state $S_j$, the processor is permitted, in accordance with the first scheduling rules, to assign the UE included in the valid UE-beam pair to the beam included in the valid UE-beam pair for a current transmission time interval (TTI), and for each action among the one or more valid actions of the sample UE-beam state $S_j$, the action includes the processor assigning the UE included in the valid UE-beam to which the action corresponds to the beam included in the valid UE-beam pair to which the action corresponds.

The processor may be configured to execute the computer-executable instructions such that the generating one or more target values includes determining, for each valid action a among A, $$y_j(a) = \left[ R(a) + \gamma * \max_{a'} Q(S_{j,next}, (a), a'; \theta^-) \right],$$

where A represents the one or more valid actions of the sample UE-beam state $S_j$, $y_j(a)$ represents the target value, from among the one or more target values, that corresponds to the valid action a, R(a) represents the metric value corresponding to the valid UE-beam pair to which the valid action a corresponds, y represents a discount parameter having a value not less than 0 and not more than 1, $S_{j,next}(a)$ represents a next UE-beam state which would result, in accordance with the first scheduling rules, from the scheduler performing valid action a with respect to the sample UE-beam state $S_j$, $\theta^-$ represents the second weights of the second DQN, and the expression $$\max_{a'} Q(S_{j,next}(a), a'; \theta^-)$$

represents a maximum Q-value from among one or more next Q-values generated by the second DQN. According to at least some example embodiments, the processor is configured to execute the computer-executable instructions such that the generating of the one or more next Q-values includes the processor using the second DQN to generate, for each valid action a' among one or more valid actions of the next UE-beam state $S_{j,next}(a)$, one of the one or more next Q-values. According to at least some example embodiments, the processor is configured to execute the computer-executable instructions such that the updating the first weights includes performing a batch gradient descent step in the first DQN using the randomly selected mini-batch of UE-beam states such that, for each UE-beam state $S_j$ of the randomly selected mini-batch of UE-beam states, a loss value to minimize=$[y_j(A)-Q(S_j, A; \theta)]^2$, where $y_j(A)$ represents a concatenation of the one or more target values $y_j(a)$ generated for each valid action a among the one or more valid actions A, the expression $Q(S_j, A; \theta)$ represents the first Q-values, and $\theta$ represents the first weights.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
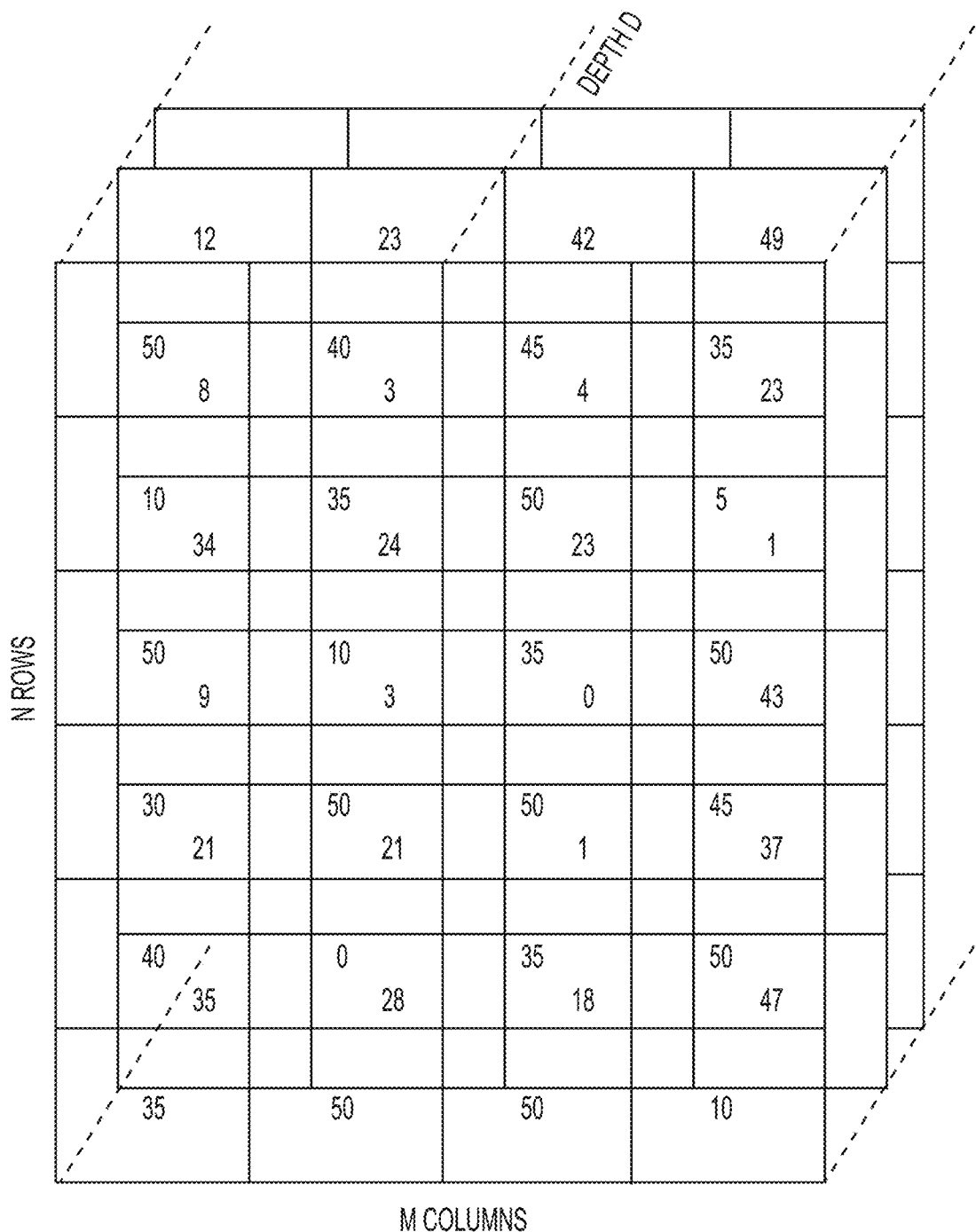
FIG. 1A is a diagram for explaining an example method of determining a sequence of actions that will produce a desirable or maximum cumulative reward.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term mobile terminal may be considered synonymous to, and may hereafter be occasionally referred to, as a user equipment (UE), terminal, mobile terminal, mobile unit, mobile device, mobile station, mobile user, access terminal (AT), subscriber, user, remote station, access terminal, receiver, etc., and may describe a remote user of wireless resources in a wireless communication network. The term base station (BS) may be considered synonymous to and/or referred to as a Node B, evolved Node B (eNB), base transceiver station (BTS), Home eNB (HeNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an e node B (enB) or a radio network controller (RNC)). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Some real world tasks may be represented in terms of states S and actions A, where each state is associated with one or more available actions, each available action is associated with (i) a corresponding reward value R and (ii) a corresponding transition to a next state (e.g., $S_t \rightarrow S_{t+1}$), and attributes of the next state are updated in accordance with a particular set of rules. FIG. 1A is a diagram for explaining an example method of a sequence of actions that will produce a desirable or maximum cumulative reward.

FIG. 1A illustrates an example state $S_t$ represented as a matrix 105 with entries organized into M columns and N rows. Each entry of the matrix 105 corresponds to a different action $A_t$ that may be taken in state $S_t$. Each entry of the matrix 105 may have a depth dimension. For example, in the example illustrated in FIG. 1A, each entry of the matrix 105 has a depth value (e.g., d in general) of at least 3, as is illustrated by the three layers of matrix 105 in FIG. 1A. Consequently, in the example illustrated in FIG. 1A, an entry of the matrix 105 corresponds to at least 3 numerical values (i.e., the 3 numerical values associated with the depth dimension at the location of the entry in the matrix 105). According to at least some example embodiments, the numerical values associated with each entry in the matrix 105 may indicate attributes of a particular task state $S_t$ represents. According to at least some example embodiments, the numerical values associated with each entry in the matrix 105 may be used in accordance with a particular set of rules to calculate a reward value associated with choosing, in state $S_t$, to take the action $A_t$ to which the entry corresponds. When a task is represented in the manner illustrated in FIG. 1A, a general method, according to at least some example embodiments, of determining a sequence of actions that will produce a desirable or maximum cumulative reward may include the steps of Algorithm 1, below. Algorithm 1 is expressed in pseudo code.

Algorithm 1

O1: Train a Deep Q-network (DQN) (e.g., by performing operations outlined in Algorithm 2, which is discussed in greater detail below).
O2: Pass a current state (e.g., state $S_t$ which the matrix 105 represents) as input to the trained DQN to determine a Q-value for each available action $A_t$ of the current state.
O3: Select the entry (e.g., an entry of the matrix 105 representing state $S_t$) out of N*M entries from a matrix (e.g., the matrix 105) that corresponds to an action $A_t$ having a highest Q-value output by the trained DQN for the current state. Each entry in the matrix has a depth dimension of size d. According to at least some example embodiments, the d numerical values can be viewed as image pixel values.
O4: Based on $(S_t, A_t)$, accumulate a reward $R_{t+1} \geq 0$, and form the next state (e.g., state $S_{t+1}$) by following a set of rules. The rules are such that they enable a Markov Decision Process (MDP) based evolution (i.e., $\{S_{t+1}, R_{t+1}\}$ completely determined by $\{S_t, A_t\}$).
O5: Find a sequence of actions that corresponds to a desirable or maximum cumulative reward by repeating operations O2-O4 for each consecutive state until reaching a terminal state $S_T$.

Algorithm 1 is explained in greater detail below with reference to FIGS. 1B-6 and an example scenario in which the task to which Algorithm 1 is applied is a task of a scheduler assigning user equipment (UEs) to beams in a 5G wireless communication network, and each state S may be represented by a matrix that has a depth of 1 and a plurality of entries each of which correspond to an action of assigning UE identified by a row of the entry to a beam identified by the column of the entry. For example, Algorithm 2, which will be discussed in greater detail below, represents an example implementation of step O1 of Algorithm 1; and steps S610, S615 and S625 of FIG. 6, which will be discussed in greater detail below, represent example implementations of steps O2, O3, and O4 of Algorithm 1, respectively.

However, the assignment of UEs to beams is but one example application of the general framework represented by Algorithm 1, and at least some example embodiments are not limited to this one example. According to at least some example embodiments, the general framework represented by Algorithm 1 can be applied for any resource assignment task or other scenario wherein the task or scenario can be framed as one of picking entries from a multi-dimensional matrix (of numerical values) in a sequential manner following a Markovian or semi-Markovian evolution process with the aim of increasing or, alternatively, maximizing cumulative rewards. The idea of viewing the matrix cells as image pixels enables the use of powerful image processing capabilities of neural networks. An example of resource assignment in a wireless communications network will now be discussed with reference to FIGS. 1B and 2.

Figure 1B:
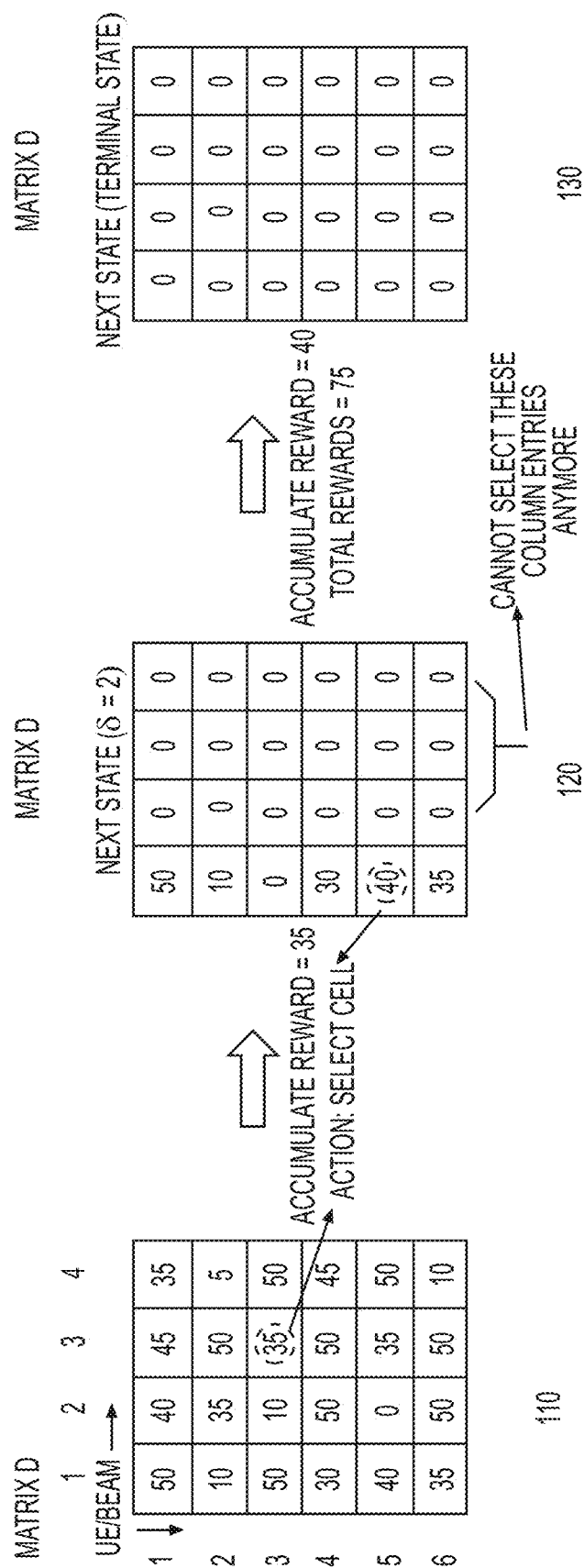
FIG. 1B is a diagram for explaining an example of resource assignment in a wireless communications network according to at least some example embodiments.
Figure 2:
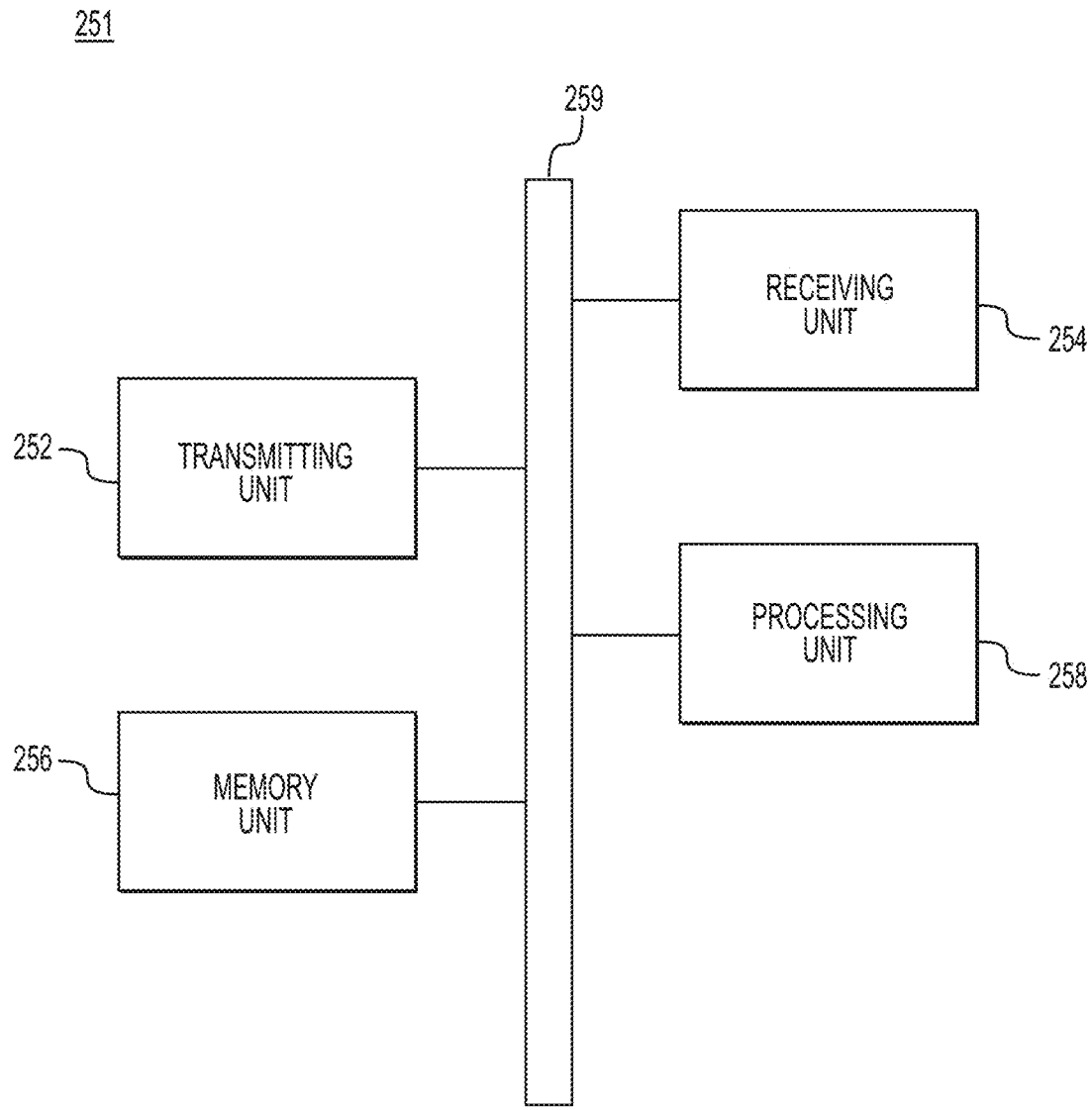
FIG. 2 is a diagram illustrating an example structure of a scheduler for a wireless communications network according to at least some example embodiments.

FIG. 1B is a diagram for explaining an example of resource assignment in a wireless communications network according to at least some example embodiments. FIG. 2 is a diagram illustrating an example structure of a scheduler 251 according to at least some example embodiments. In, for example, a wireless communications network implementing 5G multi-user MIMO (MU-MIMO), each cell has multiple sub-cells, each with its own antenna array. Each cell may include a scheduler. The scheduler 251 assigns beams to active UEs on a per transmission time interval (TTI) basis. According to at least some example embodiments, each TTI, the scheduler 251 creates a matrix D, whose (i,j)th entry denotes the proportional fair (PF) metric for UE i on beam j. For example, FIG. 1B illustrates first, second and third states 110, 120, and 130 of the matrix D. Examples of the scheduler 251 include any network element or device that performs wireless communications network scheduling functions (e.g., assigning UEs to beams). For example, the scheduler 251 may be embodied by an e-Node B (eNB) or radio network controller (RNC). The term PF metric may also be referred to, occasionally, in the present disclosure as any of a "metric," a "metric value," and a "PF metric value."

For example, as is illustrated in FIG. 1B, the scheduler 251 may generate the matrix D such that the first state 110 includes a plurality of entries (1,1)~(6,4) corresponding, respectively, to a plurality of UE-beam pairs (UE 1,beam 1)~(UE 6,beam 4). As is illustrated in FIG. 1B, each entry (i,j) in the first state 110 includes the PF metric of the corresponding UE-beam pair (UE i,beam j). For example, each entry (i,j) in the first state 110 includes the PF metric corresponding to UE i being assigned to beam j for a current TTI.

The scheduler may determine each PF metric in the first state 110 of the matrix D in accordance with known methods. For example, the scheduler 251 may determine the PF metric for each entry (i,j) of the first state 110 as the ratio of the instantaneous spectral efficiency of UE i for beam j to the long-term throughput achieved by UE i. The scheduler 251 uses the determined PF metrics to determine the manner in which UEs (e.g., UE 1-UE 6) get assigned resources (e.g., beam 1-beam 4) for the current TTI. For example, in accordance with one example scheduling scheme, the scheduler 251 attempts to give resources to the set of UEs that have the highest PF metrics.

Further, the scheduler 251 may follow a set of scheduling rules when assigning resources using matrix D. In the example illustrated in FIG. 1B, the scheduler 251 follows a first scheduling rule requiring that any two scheduled beams be separated by a minimum distance of δ and a second scheduling rule requiring that there is an upper bound on the number of UEs that can be scheduled.

Figure 3:
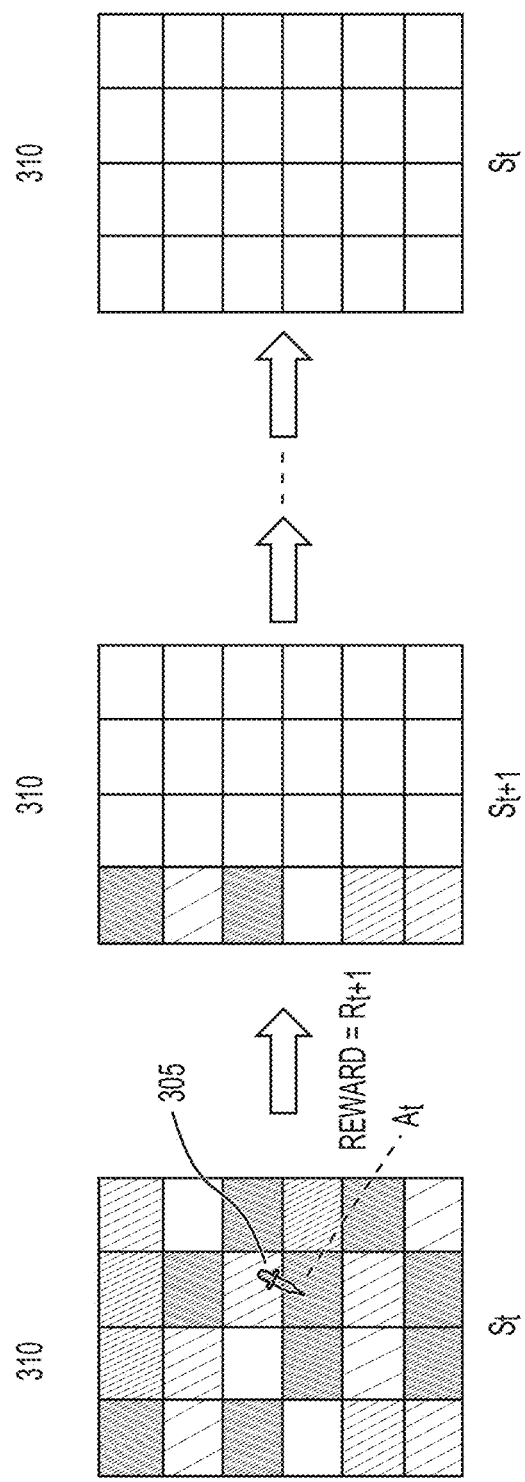
FIGS. 3 and 4 are diagrams for explaining an example of reinforcement learning according to at least some example embodiments.

In the example illustrated in FIG. 1B, the first UE-beam pair selected by the scheduler 251 from the first state 110 for scheduling in the current TTI is (UE 3,beam 3). The entry in the first state 110 corresponding to the UE-beam pair (UE 3,beam 3) is entry (3,3). As is illustrated in FIG. 3, the PF metric included in entry (3,3) of the first state 110 is 35. After selecting a UE-beam pair from the first state 110, the scheduler 251 calculates a cumulative reward based on all the UE-beam pairs the scheduler has selected for the current TTI thus far. Since, at this point, the scheduler 251 has only selected the UE-beam pair (UE 3,beam 3), the scheduler calculates the cumulative reward as 35 (i.e., the PF value of the entry (3,3) corresponding to the UE-beam pair (UE 3,beam 3)).

According to the first and second scheduling rules discussed above, the selection of the UE-beam pair (UE 3,beam 3) results in the matrix D transitioning from the first state 110 to the second state 120. As is illustrated in FIG. 1B, in the second state 120, some of the UE-beam pairs (UE 1,beam 1)~(UE 6,beam 4) are barred from being selected due to the requirements of the first and second scheduling rules followed by the scheduler 251. In FIG. 1B, a UE-beam pair being barred from selection by the scheduler 251 for a current TTI is indicated by the value of the entry in matrix D corresponding to the barred UE-beam pair being set to 0. As is noted above, in the example shown in FIG. 1B, the scheduler 251 follows first scheduling rule requiring that any two scheduled beams be separated by at least a minimum distance δ. In the example illustrated in FIG. 1B, the minimum distance δ=2. Thus, as is illustrated in FIG. 1B, in the second state 120, UE-beam pairs corresponding to beams 2-4 become barred from being selected for scheduling during the current TTI because beam 3 was already selected in the first state 101, and the distance between beam 3 and each of beam 2 and beam 4 is 1, which is less than the minimum distance δ=2.

In the example illustrated in FIG. 1B, the second UE-beam pair selected by the scheduler 251 from the second state 120 for scheduling in the current TTI is (UE 5,beam 1). The entry in the first state 110 corresponding to the UE-beam pair (UE 5,beam 1) is entry (5,1). As is illustrated in FIG. 3, the PF metric included in entry (5,1) of the second state 120 is 40. Thus, after selecting the second UE-beam pair from the second state 120, the scheduler 251 calculates a cumulative reward based on all the UE-beam pairs the scheduler has selected for the current TTI thus far as 75 (i.e., the sum of the PF value of the entry (3,3) corresponding to the UE-beam pair (UE 3,beam 3) and he PF value of the entry (5,1) corresponding to the UE-beam pair (UE 5,beam 1)).

According to the first and second scheduling rules discussed above, the selection of the UE-beam pair (UE 3,beam 3) results in the matrix D transitioning from the second state 120 to the third state 130. As is illustrated in FIG. 1B, in the third state 130, all of the UE-beam pairs (UE 1,beam 1)~(UE 6,beam 4) are barred from being selected due to the requirements of the first and second scheduling rules followed by the scheduler 251. Because no UE-beam pairs are selectable by the scheduler in the third state 130, the third state 130 is determined by the scheduler 251 to be a terminal state, and the selection of UE-beam pairs for scheduling during the current TTI ends.

Thus, in the example illustrated in FIG. 1B, for the current TTI, the scheduler 251 schedules the two selected beam pairs (UE 3,beam 3) and (UE 5,beam 1). In the present disclosure, the act of assigning a UE i to a beam j may be referred to, simply, as scheduling the UE-beam pair (UE i,beam j) or assigning the UE-beam pair (UE i,beam j). Though the example in FIG. 1B shows one possible sequence of actions (i.e., selecting the UE-beam pair (UE 3,beam 3) first, and then selecting the UE-beam pair (UE 5,beam 1)), there are several other possible sequences of actions that could have been chosen by the scheduler 251 and may have led to more desirable results. Thus, it may be advantageous to determine methods for improving or, alternatively, optimizing the process of the scheduler 251 assigning resources (e.g., assigning UEs to beams) such that a traffic throughput of the cell of the scheduler 251 is increased or, alternatively, maximized.

An example structure of the scheduler 251 will be discussed in greater detail below with reference to FIG. 2. Example methods for improving the process of assigning resources in a wireless communications network using the scheduler 251 will be discussed in in greater detail below with reference to FIGS. 3-6.

As is noted above, FIG. 2 is a diagram illustrating an example structure of a scheduler 251.

Referring to FIG. 2, the scheduler 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to one or more other network elements in a wireless communications network.

The receiving unit 254 is a device that includes hardware and any necessary software for receiving wireless signals including, for example, control signals or data signals via one or more wired and/or wireless connections to one or more other network elements in a wireless communications network.

The memory unit 256 may be any device capable of storing data including magnetic storage, flash storage, etc.

The processing unit 258 may be any device capable of processing data including, for example, a processor.

According to at least one example embodiment, any operations described herein, for example with reference to any of FIGS. 1-6, as being performed by a scheduler may be performed by an electronic device having the structure of the scheduler 251 illustrated in FIG. 2. For example, according to at least one example embodiment, the scheduler 251 may be programmed, in terms of software and/or hardware, to perform any or all of the functions described herein as being performed by a scheduler. Consequently, the scheduler may be embodied as a special purpose computer through software and/or hardware programming.

Examples of the scheduler 251 being programmed, in terms of software, to perform any or all of the functions described herein as being performed by any of the schedulers described herein will now be discussed below. For example, the memory unit 256 may store a program including executable instructions corresponding to any or all of the operations described herein with reference to FIGS. 1-4 as being performed by a scheduler. According to at least one example embodiment, additionally or alternatively to being stored in the memory unit 256, the executable instructions may be stored in a computer-readable medium including, for example, an optical disc, flash drive, SD card, etc., and the scheduler 251 may include hardware for reading data stored on the computer readable-medium. Further, the processing unit 258 may be a processor configured to perform any or all of the operations described herein with reference to FIGS. 1-4 as being performed by a scheduler, for example, by reading and executing the executable instructions stored in at least one of the memory unit 256 and a computer readable storage medium loaded into hardware included in the scheduler 251 for reading computer-readable mediums.

Examples of the scheduler 251 being programmed, in terms of hardware, to perform any or all of the functions described herein as being performed by a scheduler will now be discussed below. Additionally or alternatively to executable instructions corresponding to the functions described with reference to FIGS. 1-6 as being performed by a scheduler being stored in a memory unit or a computer-readable medium as is discussed above, the processing unit 258 may include a circuit (e.g., an integrated circuit) that has a structural design dedicated to performing any or all of the operations described herein with reference to FIGS. 1-6 as being performed by a scheduler. For example, the above-referenced circuit included in the processing unit 258 may be a FPGA or ASIC physically programmed, through specific circuit design, to perform any or all of the operations described with reference to FIGS. 1-6 as being performed by a scheduler.

As will be discussed in greater detail below with reference to FIGS. 3-6, according to at least some example embodiments, the scheduler 251 may utilize, or benefit from, reinforcement learning techniques in order to improve resource assignment.

Figure 4:
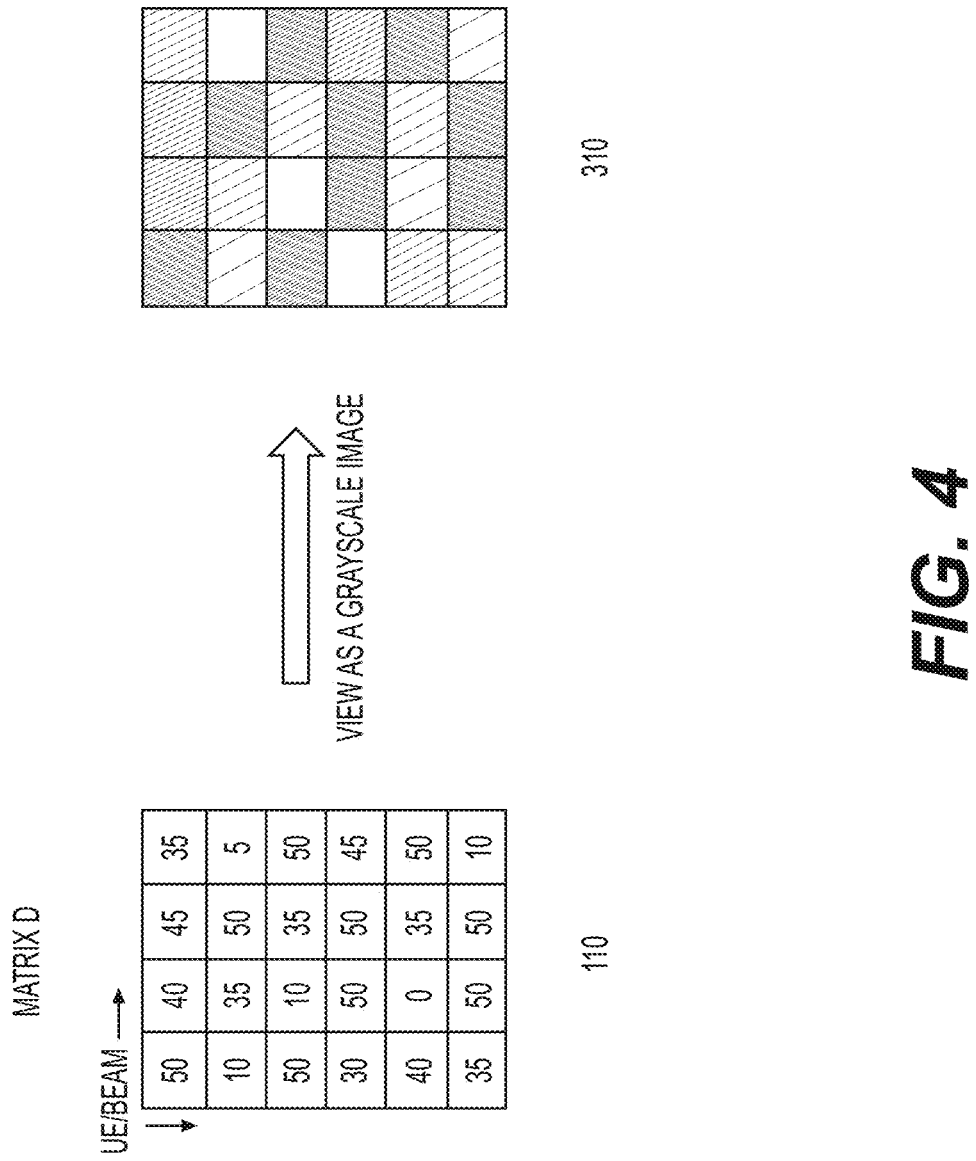

FIGS. 3 and 4 are diagrams for explaining an example of reinforcement learning according to at least some example embodiments.

FIG. 3 illustrates an example of a game in which a game board 310 includes a matrix of boxes, each of which has a different numerical value indicated by a corresponding grayscale value of the box. The game in FIG. 3 involves an action $A_t$ which may be, for example, a player throwing a dart 305 at the board 310. The game has rules that dictate both a reward $R_{t+1}$ and a transition (e.g., from state $S_t$ to state $S_{t+1}$) that result from taking certain actions A while the game board 310 is in certain states S. Further, after taking one or more actions, the game board 310 may reach a terminal state $S_T$, from which no further actions can be taken.

One way to increase or, alternatively, maximize the terminal or final score for a game such as that illustrated in FIG. 3 would be to find a desired or, alternatively, optimal policy ($\pi^*$) that maps states to actions so as to increase or, alternatively, maximize a cumulative return or reward. For example, the game illustrated in FIG. 3 may be conceptualized as is a finite Markov decision process (MDP) (where $\{S_{t+1}, R_{t+1}\}$ is determined by $\{S_t, A_t\}$), for which reinforcement learning techniques can be used.

For example, the cumulative return at time t, $G_t$, may be defined in accordance with Equation 1:

$$G_t = \sum_{k=0}^{T} \gamma^k R_{t+k+1},$$ (Equation 1)

where $0 \leq \gamma \leq 1$ is a discount parameter, T represents a terminal time point, and k is an integral index value.

The optimum action-value function (Q*) may be defined in accordance with Equation 2:

$$Q^*(s,a) = \max_\pi E[Gt|S_t=s, A_t=a, \pi],$$ (Equation 2)

where $\pi$ is a policy mapping states to actions—i.e., Q*(s, a) represents a maximum expected return achievable by following any strategy, after seeing state s and taking action a.

An action-value function $Q_i$ converges to Q* using the known Bellman equation as an iterative update, as is illustrated by Equation 3:

$$Q_{i+1}(s,a) = E[r + \gamma \max_{a'} Qi(s',a')|s,a],$$ (Equation 3)

where s' and r are the state and reward after taking action a in state s.

According to at least some example embodiments, by conceptualizing the process of assigning network resources as a game like that illustrated in FIG. 3, reinforcement learning (e.g., Q-learning techniques) like those discussed above with reference to Equations 1-3 may be applied to the task of assigning network resources (e.g., assigning UEs to beams in a cell). For example, as is illustrated in FIG. 4, the matrix D discussed above with reference to FIG. 1B may be represented as the game board 310 discussed above with reference to FIG. 3 by setting the grayscale values of the boxes in the game board 310 in accordance with the numerical values of the PF metrics in spatially corresponding boxes (i.e., entries or elements) of the matrix D.

However, even if the matrix D is reinterpreted as the game board 310, and the Q-learning techniques discussed above with respect to Equations 1-3 are applied, trying to learn the Q function for every possible state and action of the game board 310 (i.e., the matrix D) may be prohibitive in terms of time, processing resources and/or memory requirements. Thus, according to at least some example embodiments, neural networks may be used to facilitate the process of determining the Q-functions associated with the state-action pairs associated with the matrix D.

For example, neural networks may be advantageously applied to find features within structured data such as an array or vector of pixel values of an image. Further, Q-learning techniques can be combined with convolutional neural network (CNN) techniques to create a deep Q-network (DQN), as is discussed in Mnih, Volodymyr, et al, "Human-level control through deep reinforcement learning," Nature, vol. 518, no. 7540, pgs. 529-533, 2015, doi:10.1038/nature14236, the contents of which are incorporated herein, by reference.

Figure 5:
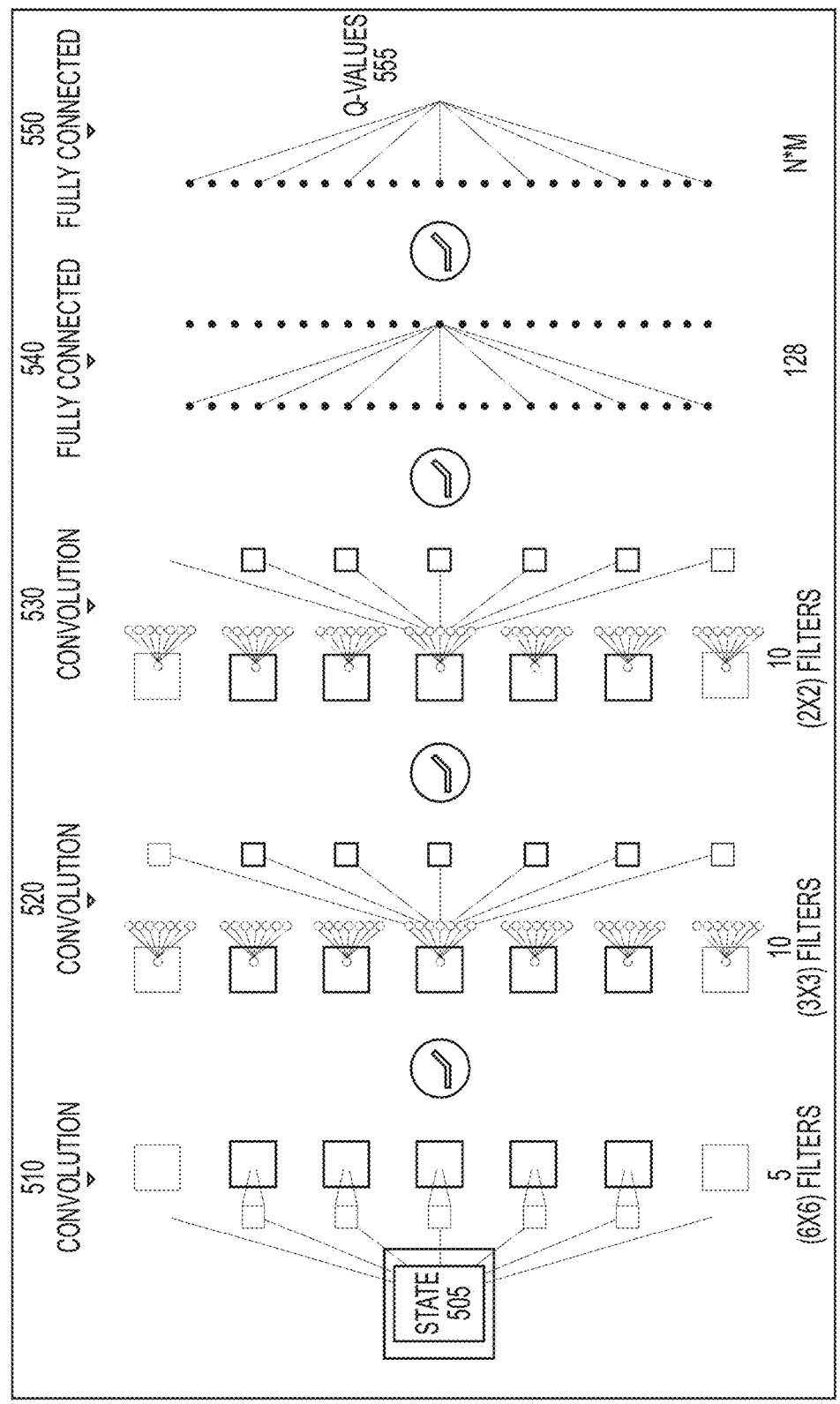
FIG. 5 illustrates an example structure of a deep Q-network (DQN) included in a scheduler according to at least some example embodiments.

FIG. 5 illustrates an example structure of a DQN 501 included in the scheduler 251 according to at least some example embodiments. As is illustrated in FIG. 5, the DQN 501 may receive a state 505 and output Q-values 555 associated with each valid action corresponding to the state 505. For example, each valid action is an action corresponding to an assignment of a UE-beam pair that the scheduler 251 is allowed to perform during the current TTI given the state 505 of the matrix D and the scheduling rules being followed by the scheduler 251. The state 505 refers to, for example, a matrix D in a particular state. For example, the first, second and third states 110, 120 and 130 of the matrix D illustrated in FIG. 1B are each examples of the state 505 which may be input to the DQN 501. A particular state of a matrix D (e.g., the first state 310 of the matrix D illustrated in FIG. 1B) may be referred to in the present disclosure, simply, as a "state" (e.g., "the first state 310").

As is illustrated in FIG. 5, the DQN 501 is may be a convolutional neural network (CNN) that may include, for example, a first convolution layer 510, a second convolution layer 520, a third convolution layer 530, a first fully-connected layer 540, and, as an output layer, a second fully-connected layer 550. In the example illustrated in FIG. 5, the first convolution layer 510 includes five size 6×6 filters, the second convolution layer 520 includes ten size 3×3 filters, and the third convolution layer 530 includes ten size 2×2 filters. According to at least some example embodiments, the activation for all hidden layers of the DQN 501 is the ReLU function and the second fully-connected layer 550 (whose outputs are the Q values 555) has a linear activation function. The structure of DQN 501 illustrated in FIG. 5 is an example. According to at least some example embodiments, parameters (e.g., the number of filters in each layer, sizes of the filters, and a number of fully connected nodes in the $4^{th}$ hidden layer) of the DQN included in the scheduler 251 may be different than those illustrated in FIG. 5, and may be chosen in accordance with the preferences of a designer or operator of the scheduler 251. For example, the above-referenced parameters of the DQN 501 may be chosen based on empirical analysis. A method of utilizing the DQN 501 of the scheduler 251 to facilitate the task of assigning UEs to beams will now be discussed in greater detail below with reference to FIG. 6.

Figure 6:
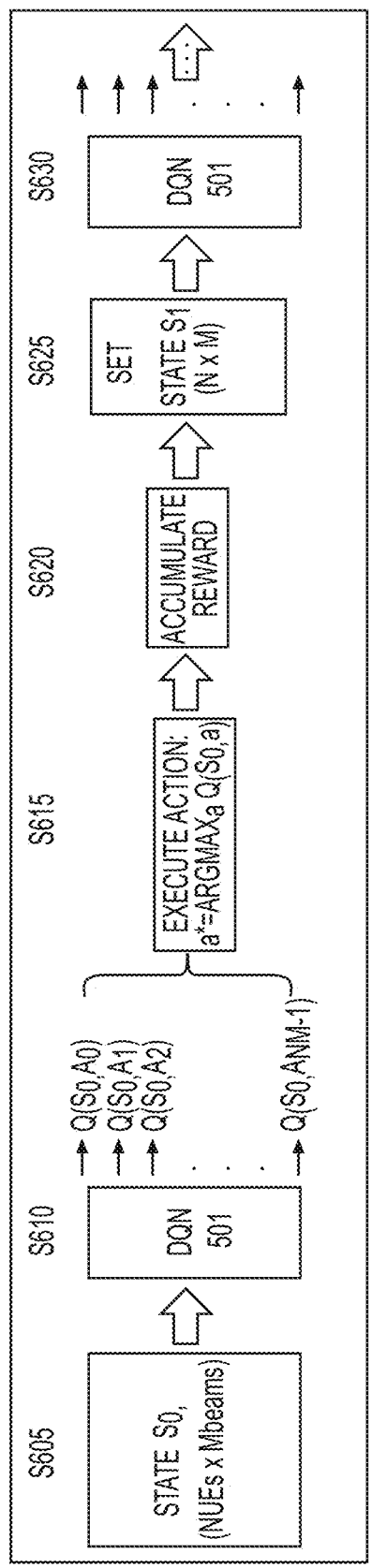
FIG. 6 illustrates an example method of operating the scheduler 251 to assign resources in a wireless communications network according to at least some example embodiments.

FIG. 6 illustrates an example method of operating the scheduler 251 to assign resources in a wireless communications network according to at least some example embodiments.

In operation S605, the scheduler 251 obtains a plurality of PF metric values. For example, in operation S605 the scheduler 251 may obtain the plurality of PF metric values in the form of a state $S_0$ of a matrix D. According to at least some example embodiments, the state $S_0$ obtained in operation S605 may be an N×M matrix including N×M PF metric values for N×M UE-beam pairs corresponding to N UEs and M beams, where N and M are positive integers. For example, the first state 110 in FIG. 1B is an example of the state $S_0$ obtained in operation S605. According to at least some example embodiments, the scheduler 251 may calculate the N×M PF metric values of the state $S_0$ in the same manner discussed above with respect to FIG. 1B. For example, the scheduler 251 may calculate the PF metrics of each of the N×M UE-beam pairs (UE i,beam j) represented in the state $S_0$ as the ratio of the instantaneous spectral efficiency of UE i for beam j to the long-term throughput achieved by UE i.

In operation S610, the scheduler 251 determines a plurality of Q-values corresponding to a plurality of UE-beam pairs represented in the state $S_0$ obtained in operation S605. For example, the scheduler 251 may provide the state $S_0$ as input to the DQN 501 included in the scheduler 251, and the DQN 501 may output Q-values corresponding to each of the UE-beam pairs represented in the state $S_0$. For example, each UE-beam pair represented in the state $S_0$ corresponds to a potential action A taken by the scheduler 251 (i.e., the scheduler 251 assigning the UE-beam pair for a current TTI). Thus, the scheduler 251 may calculate N×M Q-values (e.g., $Q(S_0,A_0)$–$Q(S_0,A_{NM-1})$) for the N×M actions corresponding to the N×M UE-beam pairs represented in the state $S_0$.

In operation S615, the scheduler 251 may determine the action A having the highest Q-value amongst the Q-values calculated in operation S610, and execute the determined action. For example if $Q(S_0,A_1)$ was the highest Q-value amongst all the Q-values determined in operation S610, then, in operation S615, the scheduler 251 executes action A1 (i.e., the scheduler 251 assigns, for the current TTI, the UE-beam pair in the state $S_0$ that corresponds to the action $A_1$.)

In operation S620, the scheduler 251 accumulates a current reward. For example, the scheduler 251 may determine the PF metric value of the UE-beam pair corresponding to the action A executed in operation S620 to be the reward for executing the action A, and add the reward to a cumulative total of rewards corresponding to actions previously executed by the scheduler 251 for the current TTI (i.e., cumulative total of PF metrics of the UE-beam pairs previously assigned by the scheduler 251 for the current TTI).

In operation S625, the scheduler 251 transitions state $S_0$ to a next state, state $S_1$. According to at least some example embodiments, in operation S625, the scheduler 251 may transition the state $S_0$ to the state $S_1$ in accordance with the action A executed in operation S615 and the scheduling rules being followed by the scheduler 251, for example, in the same manner discussed above with reference to FIG. 1B and the transition between the first state 110 and the second state 120.

In operation S630, the scheduler 251 determines a plurality of Q-values corresponding to a plurality of UE-beam pairs represented in the state $S_1$ obtained in operation S625. For example, the scheduler 251 may provide the state $S_1$ as input to the DQN 501 included in the scheduler 251. In response, the DQN 501 may output Q-values corresponding to each of the UE-beam pairs represented in the state $S_1$, for example.

After operation S630, the scheduler 251 may determine the action A having the highest Q-value amongst the Q-values calculated in operation S630 for the state $S_1$, execute the determined action, and accumulate a current reward associated with the executed action, for example, in the same manner discussed above with respect to operations S615 and S620. For example, according to at least some example embodiments, after each transition from a current state to a new state (i.e., the next state), the scheduler 251 may repeat operations S610-S625 for each new state until reaching a terminal state, at which point, the scheduler 251 may consider the process of scheduling resources (e.g., assigning UEs to beams) to be completed for the current TTI.

Example methods of training the DQN 501 will now be discussed below with reference to Algorithm 2. Algorithm 2 is expressed in pseudocode representing operations that may be performed, for example, by the scheduler 251 in order to train the DQN 501. Further, according to at least some example embodiments, the DQN 501 can be trained by a device (e.g., a trainer, computer or server) other than the scheduler 251 performing operations included in Algorithm 2, and the trained DQN 501 may be included in the scheduler 251 after the training.

Algorithm 2

P1: Initialize Q (i.e., DQN) with random primary weights θ.
P2: Set frozen weights θ⁻=to primary weights θ.
P3: Fit DQN with samples using greedy selection approach: $Q_{greedy}(S, a)$=cumulative reward obtained by taking action a in state S, followed by greedy selection from next state until terminal state reached.
P3': If not using greedy selection approach (for training speed-up), fit using only penultimate state samples and associated action-rewards as Q values.
P4: Store above samples and several more randomly generated samples in a replay buffer.

P5: Select a random mini-batch of samples from the replay buffer. For each sample $S_j$ in the mini-batch:
- P5-1: Pass $S_j$ through current network weights ($\theta$) to obtain $Q(S_j, A; \theta)$ for all actions $a \in A$.
- P5-2: Obtain next state $S_{j,next}(a)$ for each valid action $a \in A$ in $S_j$ (i.e., actions with non-zero rewards, $R(a)>0$).
- P5-3: For each valid action $a \in A$ in $S_j$, pass $S_{j,next}(a)$ through a prior (frozen) version of network weights ($\theta^-$) to compute a target, $y_j(a)$ as:

For non-terminal state $S_{j,next}(a)$:

$$y_j(a) = \left[R(a) + \gamma * \max\left(Q_{greedy}, \max_{a'}Q(S_{j,next}(a), a'; \theta^-)\right)\right],$$

if using $Q_{greedy}$ for speed-up;

$$y_j(a) = \left[R(a) + \gamma * \max_{a'}Q(S_{j,next}, (a), a'; \theta^-)\right],$$

if not using $Q_{greedy}$ for speed-up;

For terminal state $S_{j,next}(a)$:

$y_j(a) = R(a)$;

For actions with zero rewards:

$y_j(a) = 0$.

- P5-4: Obtain the target vector $y_j(A)$ by concatenating $y_j(a)$ for all $a \in A$.

P6 Update $\theta$ by performing a batch gradient descent step in the DQN using the mini-batch of samples, where for each sample $S_j$, the loss value to minimize = $[y_j(A) - Q(S_j, A; \theta)]^2$ (or any other suitably chosen loss function).

P7: After several mini-batches of sampling and training, set $\theta^- = \theta$, and continue with next set of sampling/training.

Referring to Algorithm 2, in step P1, the scheduler 251 initializes primary weights $\theta$, which are the weights of the DQN 501. According to at least some example embodiments, the scheduler 251 uses random values as the initial values of the primary weights $\theta$.

In step P2, the scheduler the scheduler 251 sets frozen weights $\theta^- =$ to primary weights $\theta$.

In step P3, the scheduler fits the DQN 501 with samples using a greedy selection approach $Q_{greedy}(S, a)$ such that $Q_{greedy}(S, a)$ is equal to a cumulative reward obtained by taking action a in state S, followed by greedy selection from next state until the terminal state reached.

Alternatively, in step P3', in a case where the greedy selection approach is not being used by the scheduler 251, the scheduler 251 may fit the DQN 501 using only penultimate state (i.e., one state prior to terminal state) samples and associated action-rewards as Q values. Note that in the penultimate state, $Q(S, a) = R(a)$. Once the Q values for the penultimate states are learnt by the DQN 501, the DQN 501 can learn the Q values for the states prior to the penultimate states and so on.

In step P4, the scheduler stores sample states generated in step P3 or P3' in a replay buffer. According to at least some example embodiments, the replay buffer may be included in the memory unit 256 of the scheduler 251. For example, for each transition from a state $S_j$ to a next state $S_{j,next}$ that occurs in step P3 or P3', the scheduler 251 may store both states $S_j$ and $S_{j,next}$ as sample states in the replay buffer. In step P4, in addition to storing the samples generated in step P3 or P3', the scheduler 251 may also store additional sample states in the replay buffer. For example, a designer or operator of the scheduler 251 could use knowledge the intended operating environment of the scheduler 251 to generate several additional example sample states that correspond to the distribution/pattern that would be encountered in the real application of interest. For example, the additional example sample states could be generated so as to capture any correlation pattern that a UE's PF metric is expected see across beams.

In step P5, the scheduler 251 selects a random mini-batch of samples from the replay buffer and performs, for each sample $S_j$ included in the random min-batch, steps P5-1 through P5-6.

In step P5-1, the scheduler 251 applies the sample state $S_j$ as an input to the DQN 501 using the current primary weights $\theta$ to obtain, as the output of the DQN 501, Q-values for all actions $a \in A$ (i.e., to obtain $Q(S_j, A; \theta)$).

In step P5-2, the scheduler 251 obtains the next state $S_{j,next}(a)$ for each valid action $a \in A$ in state $S_j$, where a valid action a is an action (i.e., assigning a particular UE-beam pair represented in sample state $S_j$) the scheduler 251 is allowed to perform in view of the scheduling rules the scheduler 251 is currently following (e.g., beams assigned for the same TTI must be separated by at least a minimum distance $\delta = 2$). For example, valid actions are actions with non-zero rewards, (i.e., $R(a) > 0$, where $R(a)$ represents a reward obtained as a result of performing action a).

In step P5-3, for each valid action $a \in A$ in state Sj, the scheduler applies the next state resulting from taking action a, $S_{j,next}(a)$, to the DQN 501 using the frozen weights $\theta^-$ (instead of the primary weights $\theta$) to compute a target $y_j(a)$.

In step P5-3, when the next state $S_{j,next}(a)$ is a non-terminal state, the scheduler 251 calculates that target $y_j(a)$ in accordance with Equation 4 or Equation 5:

$$y_j(a) = \left[R(a) + \gamma * \max\left(Q_{greedy}, \max_{a'}Q(S_{j,next}(a), a'; \theta^-)\right)\right]; \quad \text{(Equation 4)}$$

$$y_j(a) = \left[R(a) + \gamma * \max_{a'}Q(S_{j,next}, (a), a'; \theta^-)\right]. \quad \text{(Equation 5)}$$

The scheduler 251 may use Equation 4 in step P5-3 when using a greedy selection approach $Q_{greedy}$. Otherwise, the scheduler 251 may use Equation 5.

In step P5-3, when the next state $S_{j,next}(a)$ is a terminal state, the scheduler 251 calculates that target $y_j(a)$ in accordance with Equation 6:

$$y_j(a) = R(a). \quad \text{(Equation 6)}$$

In step P5-3, when an action a is an action with 0 rewards (e.g., an action that is impermissible in view of the scheduling rules being followed by the scheduler 251, like assigning a UE-beam pair that is less than the minimum distance $\delta$ away from a UE-beam pair previously assigned for the same TTI; or no PF value in that beam), the scheduler 251 calculates that target $y_j(a)$ in accordance with Equation 7:

$$y_j(a) = 0. \quad \text{(Equation 7)}$$

In Equations 4 and 5, $R(a)$ represents a reward obtained as a result of performing action a, $\gamma$ represents a discount parameter having a value not less than 0 and not more than 1, and the expression $$\max_{a'}Q(S_{j,next}(a), a'; \theta^-)$$

represents a maximum Q-value from among all valid actions a' that may be performed with respect to the next state $S_{j,next}(a)$.

In step P5-4, the scheduler 251 obtains the target vector $y_j(A)$ by concatenating $y_j(a)$ for all a εA.

In step P6, the scheduler 251 updates θ by performing a batch gradient descent step in the DQN 501 using the mini-batch of samples $S_j$, with a loss value L to minimize being expressed, for example, by Equation 8 (or any other suitably chosen loss function):

$$L=[y_j(A)-Q(S,A;\theta)]^2 \qquad \text{(Equation 8)}$$

After several mini-batches of sampling and training, set $\theta^-=\theta$, and continue with next set of sampling/training.

In step P7, sets the frozen weights $\theta^-$=to the current primary weights θ. Step P5-6 may be performed periodically. For example, scheduler 251 may iteratively perform several cycles of selecting mini-batches of samples $S_j$ and performing steps P5 through P6. Further, every time a threshold number of cycles has been performed or a threshold number of batches of samples $S_j$ has been processed in accordance with steps P5 through P6, the scheduler 251 may perform step P7.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of determining a sequence of actions, the method comprising:
    training a first deep Q-network (DQN);
    providing a plurality of entries of a first multi-dimensional matrix as input to the DQN, the first matrix representing a first state, each entry of the first matrix representing an action that can be taken in the first state;
    determining, using the first DQN, a plurality of Q-values for the plurality of entries of the first matrix, respectively;
    executing a first action, the first action being the action represented by the entry, from among the plurality of entries, for which the first DQN determined the highest Q-value among the plurality of determined Q-values;
    accumulating a reward based on executing the first action; and
    transitioning from the first state to a next state in accordance with a first set of rules and the executed first action,
    wherein the training of the first DQN comprises:
        initializing first weights;
        randomly selecting a mini-batch of sample states from among a plurality of stored states, each stored state including a plurality of entries corresponding to a plurality of actions; and
        for each sample state $S_j$ among the randomly selected mini-batch of sample states
            determining one or more valid actions of the sample state $S_j$ based on the first set of rules,
            generating, using the first DQN having the first weights, one or more first Q-values corresponding, respectively, to the one or more valid actions of the sample state $S_j$,
            generating, using a second DQN having second weights, one or more target values corresponding, respectively, to the one ore more valid actions of the sample state $S_j$, and
            updating the first weights based on the one ore more first Q-values and the one or more target values.

2. The method of claim 1, wherein, for each entry among the plurality of entries of the first matrix, a numerical value of the entry corresponds to a reward associated with executing the action represented by the entry.

3. The method of claim 1, wherein, each valid action of the sample state $S_j$ is an action that is permitted to be executed in the sample state $S_j$, in accordance with the first set of rules.

4. The method of claim 1, wherein initializing the first weights includes randomly selecting the first weights.

5. The method of claim 4, further comprising:
    initializing the second weights by setting the second weights equal to the first weights.

6. The method of claim 1,
    wherein the generating one or more target values comprises:
    determining, for each valid action a among A, $$y_j(a) = \left[ R(a) + \gamma * \max_{a'} Q(S_{j,next}, (a), a'; \theta^-) \right],$$

A representing the one or more valid actions of the sample state $S_j$,
    $y_j$ (a) representing the target value, from among the one or more target values, that corresponds to the valid action a,
    R (a) representing a reward value corresponding to the valid action a,
    y representing a discount parameter having a value not less than 0 and not more than 1,
    $S_{j,next}(a)$ representing a next state which would result, in accordance with $s_j$, the first set of rules, from executing valid action a with respect to the sample state $S_j$,
    $\theta^-$ representing the second weights of the second DQN, the expression $$\max_{a'} Q(S_{j,next}(a), a'; \theta^-)$$

representing a maximum Q-value from among one or more next Q-values generated by the second DQN,
    the generating of the one or more next Q-values including the second DQN generating, for each valid action a' among one or more valid actions of the next state $S_{J,next}(a)$, one of the one or more next Q-values, and
    wherein the updating the first weights includes performing a batch gradient descent step in the first DQN using the randomly selected mini-batch of samples such that, for each sample S of the randomly selected mini-batch of samples, a loss value to minimize=$[y_j(A)-Q(S_j, A;\theta)]^2$,
    $y_j(A)$ representing a concatenation of the one or more target values $y_j$ (a) generated for each valid action a among the one or more valid actions A,
    the expression $Q(S_j, A;\theta)$ representing the first Q-values,
    θ representing the first weights.

7. The method of claim 1, further comprising:
    iteratively performing each of the providing, determining, executing, accumulating and transitioning steps for each consecutive state until reaching a terminal state, the terminal state being a state for which no valid action exists.

8. The method of claim 7, wherein a valid action of a current state is an action that is permitted to be executed in the current state, in accordance with the first set of rules.

9. The method of claim 1, wherein executing the first action includes assigning resources in a wireless communications network.

10. A method of operating a scheduler in a wireless communications network, the method comprising:
obtaining, at the scheduler, a plurality of metric values,
each metric value corresponding to a UE-beam pair, from among a plurality of UE-beam pairs,
each UE-beam pair including a UE from among a plurality of UEs and a beam from among a plurality of beams;
performing a UE-beam pair selecting operation including,
determining, by a deep Q-network (DQN) of the scheduler, based on the plurality of metric values, a plurality of Q-values,
the plurality of Q-values corresponding, respectively, to the plurality of UE-beam pairs, and
selecting a UE-beam pair from among the plurality of UE-beam pairs based on the plurality of Q-values; and
assigning the UE included in the selected UE-beam pair to the beam included in the selected UE-beam pair.

11. The method of claim 10, wherein the selecting includes selecting a highest Q-value, from among the plurality of Q-values, as the selected Q-value.

12. The method of claim 10, wherein,
the plurality of metric values are a plurality of proportional fair (PF) metric values, respectively.

13. The method of claim 12, wherein for each PF metric value, from among the plurality of PF metric values,
the PF metric value is a ratio of an instantaneous spectral efficiency of a first UE with respect to a first beam to a throughput of the first UE,
the first UE being the UE included in the UE-beam pair to which the PF metric value corresponds,
the first beam being the beam included in the UE-beam pair to which the PR metric value corresponds.

14. The method of claim 10, wherein the assigning includes the scheduler assigning the UE included in the selected UE-beam pair to the beam included in the selected UE-beam pair for a current transmission time interval (TTI).

15. The method of claim 14, wherein,
the selected UE-beam pair is one of a plurality of selected UE-beam pairs,
the method further comprises:
generating, by the scheduler, the plurality of the plurality of selected UE-beam pairs by performing the UE-beam pair selecting operation a plurality of times, and
the assigning comprises:
assigning the UEs included in the plurality of selected UE-beam pairs to the beams included in the plurality of selected UE-beam pairs, respectively, for the current TTI.

16. A method of training a scheduler to perform scheduling in a wireless communications network with respect to a plurality of user equipment (UEs) and a plurality of beams, the method comprising:
randomly selecting a mini-batch of sample UE-beam states from among a plurality of stored UE-beam states, each stored UE-beam state including,
a plurality of UE-beam pairs, and
a plurality of metric values corresponding to the plurality of UE-beam pairs, respectively,
each UE-beam pair including a UE from among the plurality of UEs and a beam from among the plurality of beams; and
for each sample UE-beam state $S_j$ among the randomly selected mini-batch of sample UE-beam states
determining one or more valid actions of the sample UE-beam state $S_j$ corresponding, respectively, to one or more valid UE-beam pairs of the UE-beam state $S_j$, based on first scheduling rules,
generating, using a first deep Q-network (DQN) having first weights, one or more first Q-values corresponding, respectively, to the one or more valid actions of the sample UE-beam state $S_j$,
generating, using a second DQN having second weights, one or more target values corresponding, respectively, to the one or more valid actions of the sample UE-beam state $S_j$, and
updating the first weights based on the one or more first Q-values and the one or more target values.

17. The method of claim 16,
wherein the generating one or more target values comprises:
determining, for each valid action a among A, $$y_j(a) = \left[R(a) + \gamma * \max_{a'} Q(S_{j,next}, (a), a'; \theta^-)\right],$$

A representing the one or more valid actions of the sample UE-beam state $S_j$,
$y_j(a)$ representing the target value, from among the one or more target values, that corresponds to the valid action a,
R(a) representing the metric value corresponding to the valid UE-beam pair to which the valid action a corresponds,
γ representing a discount parameter having a value not less than 0 and not more than 1,
$S_{j,next}(a)$ representing a next UE-beam state which would result, in accordance with the first scheduling rules, from the scheduler performing valid action a with respect to the sample UE-beam state $S_j$,
$\theta^-$ representing the second weights of the second DQN,
the expression $$\max_{a'} Q(S_{j,next}(a), a'; \theta^-)$$

representing a maximum Q-value from among one or more next Q-values generated by the second DQN,
the generating of the one or more next Q-values including the second DQN generating, for each valid action a' among one or more valid actions of the next UE-beam state $S_{j,next}(a)$, one of the one or more next Q-values, and
wherein the updating the first weights includes performing a batch gradient descent step in the first DQN using the randomly selected mini-batch of UE-beam states such that, for each UE-beam state S of the randomly selected mini-batch of UE-beam states, a loss value to minimize=$[y_j(A)-Q(S_j, A;\theta)]^2$, $y_j(A)$ representing a concatenation of the one or more target values $y_j$ (a) generated for each valid action a among the one or more valid actions A, the expression $Q(S_j, A;\theta)$ representing the first Q-values, $\theta$ representing the first weights.

18. The method of claim 16 further comprising:
initializing the first weights by randomly selecting the first weights; and
initializing the second weights by setting the second weights equal to the first weights.

19. The method of claim 16, wherein,
for each valid UE-beam pair among the one or more valid UE-beam pairs of the sample UE-beam state $S_j$, the scheduler is permitted, in accordance with the first scheduling rules, to assign the UE included in the valid UE-beam pair to the beam included in the valid UE-beam pair for a current transmission time interval (TTI), and
for each action among the one or more valid actions of the sample UE-beam state $S_j$, the action includes the scheduler assigning the UE included in the valid UE-beam to which the action corresponds to the beam included in the valid UE-beam pair to which the action corresponds.

20. A scheduler comprising:
memory storing computer-executable instructions; and
a processor configured to execute the computer-executable instructions such that the processor is configured to,
obtain a plurality of metric values,
each metric value corresponding to a UE-beam pair, from among a plurality of UE-beam pairs,
each UE-beam pair including a UE from among a plurality of UEs and a beam from among a plurality of beams,
perform a UE-beam pair selecting operation including,
determining, using a deep Q-network (DQN), based on the plurality of metric values, a plurality of Q-values,
the plurality of Q-values corresponding, respectively, to the plurality of UE-beam pairs, and
selecting a UE-beam pair from among the plurality of UE-beam pairs based on the plurality of Q-values, and
assign the UE included in the selected UE-beam pair to the beam included in the selected UE-beam pair.

21. The scheduler of claim 20,
wherein the processor is configured to execute the computer-executable instructions such that the selected UE-beam pair is one of a plurality of selected UE-beam pairs,
wherein the processor is configured to execute the computer-executable instructions such that the processor is further configured to,
generate, by the scheduler, the plurality of selected UE-beam pairs by performing the UE-beam pair selecting operation a plurality of times, and
wherein the processor is configured to execute the computer-executable instructions such that the assigning includes assigning the UEs included in the plurality of selected UE-beam pairs to the beams included in the plurality of selected UE-beam pairs, respectively, for the current TTI.

22. The scheduler of claim 20, wherein the processor is configured to execute the computer-executable instructions such that the selecting includes selecting a highest Q-value, from among the plurality of Q-values, as the selected Q-value.

23. The scheduler of claim 20, wherein the processor is configured to execute the computer-executable instructions such that the plurality of metric values are a plurality of proportional fair (PF) metric values, respectively.

24. The scheduler of claim 20, wherein the processor is configured to execute the computer-executable instructions such that for each PF metric value, from among the plurality of PF metric values,
the PF metric value is a ratio of an instantaneous spectral efficiency of a first UE with respect to a first beam to a throughput of the first UE,
the first UE being the UE included in the UE-beam pair to which the PF metric value corresponds,
the first beam being the beam included in the UE-beam pair to which the PF metric value corresponds.

25. The scheduler of claim 20, wherein the processor is configured to execute the computer-executable instructions such that the assigning includes assigning the UE included in the selected UE-beam pair to the beam included in the selected UE-beam pair for a current transmission time interval (TTI).

26. A scheduler comprising:
memory storing computer-executable instructions; and
a processor configured to execute the computer-executable instructions such that the processor is configured to,
randomly select a mini-batch of sample UE-beam states from among a plurality of stored UE-beam states,
each stored UE-beam state including,
a plurality of UE-beam pairs, and
a plurality of metric values corresponding to the plurality of UE-beam pairs, respectively,
each UE-beam pair including a UE from among the plurality of UEs and a beam from among the plurality of beams; and
for each sample UE-beam state $S_j$ among the randomly selected mini-batch of sample UE-beam states,
determine one or more valid actions of the sample UE-beam state $S_j$ corresponding, respectively, to one or more valid UE-beam pairs of the UE-beam state $S_j$, based on first scheduling rules,
generate, using a first deep Q-network (DQN) having first weights, one or more first Q-values corresponding, respectively, to the one or more valid actions of the sample UE-beam state $S_j$,
generate, using a second DQN having second weights, one or more target values corresponding, respectively, to the one or more valid actions of the sample UE-beam state $S_j$, and
update the first weights based on the one or more first Q-values and the one or more target values.

27. The scheduler of claim 26,
wherein the processor is configured to execute the computer-executable instructions such that the generating one or more target values includes,
determining, for each valid action a among A, $$y_j(a) = \left[R(a) + \gamma * \max_{a'} Q(S_{j,next}, (a), a'; \theta^-)\right],$$

A representing the one or more valid actions of the sample UE-beam state $S_j$, $y_j(a)$ representing the target value, from among the one or more target values, that corresponds to the valid action a, R(a) representing the metric value corresponding to the valid UE-beam pair to which the valid action a corresponds, γ representing a discount parameter having a value not less than 0 and not more than 1, $S_{j,next}(a)$ representing a next UE-beam state which would result, in accordance with the first scheduling rules, from the scheduler performing valid action a with respect to the sample UE-beam state $S_j$, $\theta^-$ representing the second weights of the second DQN, the expression $$\max_{a'} Q(S_{j,next}(a), a'; \theta^-)$$

representing a maximum Q-value from among one or more next Q-values generated by the second DQN, wherein the processor is configured to execute the computer-executable instructions such that the generating of the one or more next Q-values includes the processor using the second DQN to generate, for each valid action a' among one or more valid actions of the next UE-beam state $S_{j,next}(a)$, one of the one or more next Q-values, and wherein the processor is configured to execute the computer-executable instructions such that the updating the first weights includes performing a batch gradient descent step in the first DQN using the randomly selected mini-batch of UE-beam states such that, for each UE-beam state S of the randomly selected mini-batch of UE-beam states, a loss value to minimize=$[y_j(A) - Q(S_j, A; \theta)]^2$ $y_j(A)$ representing a concatenation of the one or more target values $y_j(a)$ generated for each valid action a among the one or more valid actions A, the expression $Q(S_j, A; \theta)$ representing the first Q-values, θ representing the first weights.

28. The scheduler of claim 26, wherein the processor is configured to execute the computer-executable instructions such that the processor is further configured to, initialize the first weights by randomly selecting the first weights; and initialize the second weights by setting the second weights equal to the first weights.

29. The scheduler of claim 26, wherein the processor is configured to execute the computer-executable instructions such that, for each valid UE-beam pair among the one or more valid UE-beam pairs of the sample UE-beam state $S_j$, the processor is permitted, in accordance with the first scheduling rules, to assign the UE included in the valid UE-beam pair to the beam included in the valid UE-beam pair for a current transmission time interval (TTI), and for each action among the one or more valid actions of the sample UE-beam state $S_j$, the action includes the processor assigning the UE included in the valid UE-beam to which the action corresponds to the beam included in the valid UE-beam pair to which the action corresponds.

* * * * *

UNITED STATES PATENT AND TRADEMARK OFFICE
CERTIFICATE OF CORRECTION

| | | |
|---|---|---|
| PATENT NO. | : 11,528,720 B2 | |
| APPLICATION NO. | : 17/040722 | |
| DATED | : December 13, 2022 | |
| INVENTOR(S) | : Chandrasekar Sankaran | |

It is certified that error appears in the above-identified patent and that said Letters Patent is hereby corrected as shown below:

In the Claims

At Column 19, Claim number 1, Line number 66, delete "ore" and insert --or--

At Column 20, Claim number 1, Line number 1, delete "ore" and insert --or--

Signed and Sealed this
Twenty-eighth Day of February, 2023

Katherine Kelly Vidal
*Director of the United States Patent and Trademark Office*